United States Patent Office.

JOSEPH PHILIPPS, OF COLOGNE, GERMANY.

Letters Patent No. 98,883, dated January 18, 1870.

IMPROVED MODE OF PRODUCING LIGHT BY THE COMBINATION OF SOLID AND LIQUID HYDROCARBONS.

The Schedule referred to in these Letters Patent and making part of the same.

To all whom it may concern:

Be it known that I, Dr. JOSEPH PHILIPPS, of Cologne, Germany, have invented a new and improved Mode of Burning certain Hydrocarbons, for the purpose of producing light. I propose to call the same "Carbo-Oxygen Light;" and declare hereby that the following is a full and exact description thereof.

The nature of this invention consists in burning the solid products of the destructive distillation of carboniferous bodies belonging to the coal-series of the geologists, (vide Naumann's Lehrbuch (text-book) der Geognosie, vol. i, page 650,) together with the liquid products of the same under admission of oxygen.

Instead of these latter, I may make use of certain natural hydrodes, such as naphtha and petroleum, as they are now recognized by Pelouze, Schorlemmer, and Van Der Weyde, and their products of distillation; or if these are sufficiently rich in highly-carbonized compounds, I employ them alone.

Among the solid hydrocarbons of the destructive distillation of the bodies mentioned, I find the following particularly serviceable: Naphthaline, ($C^{20}H^8$,) chrysene, ($C^{30}H^8$,) idrialine, ($C^{30}H^{10}$,) and anthracene, ($C^{30}H^{12}$.)

Among the fluid ones, the hydrocarbons of the formula, $C^6+xC^2H^2$, which, according to Cahours and Mansfield, are met with in both the wood and coal-tar.

I furthermore mention the oils containing aniline and its homologues, and those products of the distillation of coal-tar running over at a still higher temperature. I do, however, not confine myself to them alone, but make, also, use of the less well-examined distillates of lignite, peat, asphaltum, bituminous schists, and resin.

The above-mentioned substances being rich in carbon, could not be burned with common air, even not if the same were compressed, from the fact that they would yield a superabundance of soot. In order, therefore, to insure a more perfect combustion, I employ oxygen, which, when used with the common illuminating-substances would cause them to burn with a non-luminous flame. When, however, employed with substances containing a greater amount of carbon than that possessed by the ordinary lighting-substances, highly-brilliant and intensely luminous flames are produced.

Having thus described my invention,

What I claim as new, and desire to secure by Letters Patent, is—

The incorporation of one or several of the solid products of the distillation of wood or carboniferous bodies, belonging to the coal-series, into one or several of the liquid products of the same, or their incorporation into naphtha, petroleum, or their distillates, so as to have highly-carburetted compounds, and the combustion of these compounds by means of oxygen, for the purpose of producing light.

DR. JOS. PHILIPPS.

Witnesses:
 FERD. KOHLSTADT,
 C. EYMAEL.